(12) United States Patent
Garcia Tormo et al.

(10) Patent No.: US 10,638,587 B2
(45) Date of Patent: Apr. 28, 2020

(54) DEVICE AND METHOD FOR PROCESSING AN INDUCTOR CURRENT

(71) Applicant: KONINKLIJKE PHILIPS N.V., Eindhoven (NL)

(72) Inventors: Albert Garcia Tormo, Eindhoven (NL); Hendrik Huisman, Tilburg (NL); Bernd Ackermann, Aachen (DE); Peter Luerkens, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 115 days.

(21) Appl. No.: 15/750,976

(22) PCT Filed: Jul. 29, 2016

(86) PCT No.: PCT/EP2016/068121
§ 371 (c)(1),
(2) Date: Feb. 7, 2018

(87) PCT Pub. No.: WO2017/025349
PCT Pub. Date: Feb. 16, 2017

(65) Prior Publication Data
US 2018/0235063 A1 Aug. 16, 2018

(30) Foreign Application Priority Data

Aug. 10, 2015 (EP) .................................... 15180349

(51) Int. Cl.
*H05G 1/10* (2006.01)
*H05G 1/30* (2006.01)
(Continued)

(52) U.S. Cl.
CPC ................. *H05G 1/10* (2013.01); *G05B 6/02* (2013.01); *H02M 3/156* (2013.01); *H05G 1/30* (2013.01);
(Continued)

(58) Field of Classification Search
CPC .......... G05B 6/02; H02M 1/00; H02M 3/156; H02M 3/157; H02M 2001/0009; H05G 1/10; H05G 1/30
See application file for complete search history.

(56) References Cited

U.S. PATENT DOCUMENTS

2009/0066311 A1   3/2009   Luerkens
2013/0169248 A1   7/2013   Zhang
(Continued)

OTHER PUBLICATIONS

De Gusseme, Koen et al "Sample Correction for Digitally controlled Boost PFC Converters Operating in both CCM and DCM", Annual IEEE Applied Power Electronics Conference and Exposition, Feb. 2003, vol. 1, pp. 389-395.

*Primary Examiner* — Mark R Gaworecki
(74) *Attorney, Agent, or Firm* — Larry Liberchuk

(57) ABSTRACT

The present invention relates to a device (1) for controlling a power converter (100), the device (1) comprising: a sensor module (10), which is configured to measure an inductor current (i_L) through an inductor of the power converter (100); a compensation module (20), which is configured to generate a compensation waveform (i_c); and an operating module (30), which is configured to provide a continuous conduction mode current signal (i_CCM) based on the compensation waveform (i_c) and of the inductor current (i_L) and which is configured to control the power converter (100) based on the provided continuous conduction mode current signal (i_CCM).

9 Claims, 9 Drawing Sheets

(51) Int. Cl.
  *G05B 6/02* (2006.01)
  *H02M 3/156* (2006.01)
  *H02M 1/00* (2006.01)
  *H02M 3/157* (2006.01)

(52) U.S. Cl.
  CPC .............. *H02M 1/00* (2013.01); *H02M 3/157* (2013.01); *H02M 2001/0009* (2013.01)

(56) References Cited

U.S. PATENT DOCUMENTS

| | | |
|---|---|---|
| 2013/0241506 A1 | 9/2013 | Yang |
| 2013/0314062 A1 | 11/2013 | Notman |
| 2015/0146458 A1 | 5/2015 | Lim |

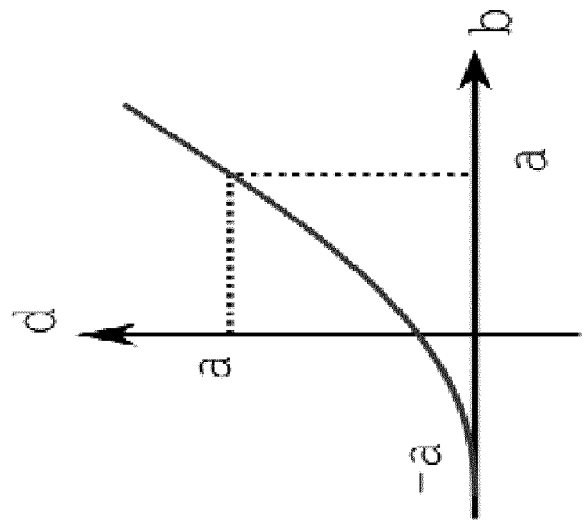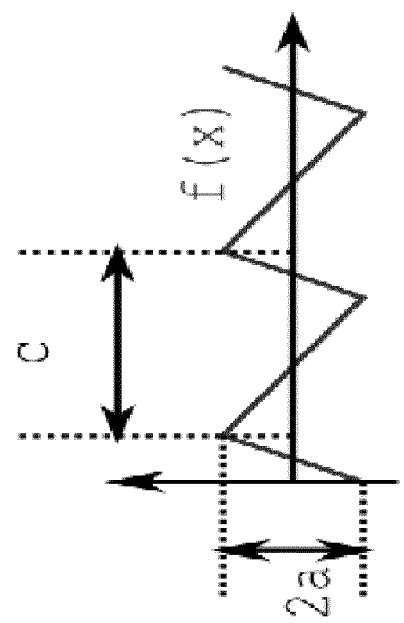
Fig. 3

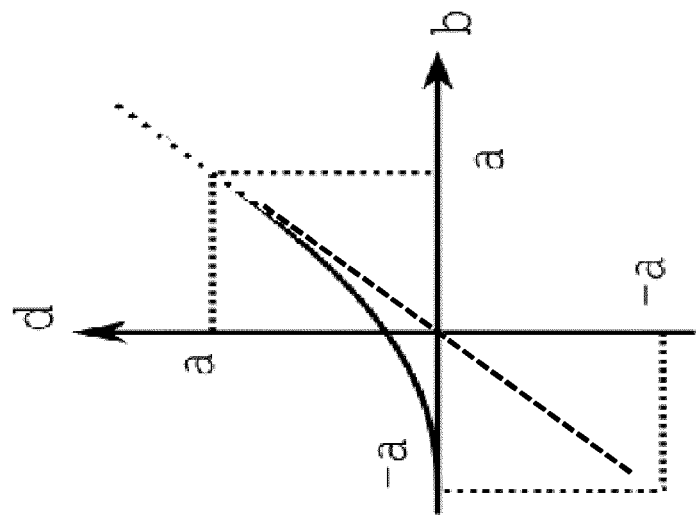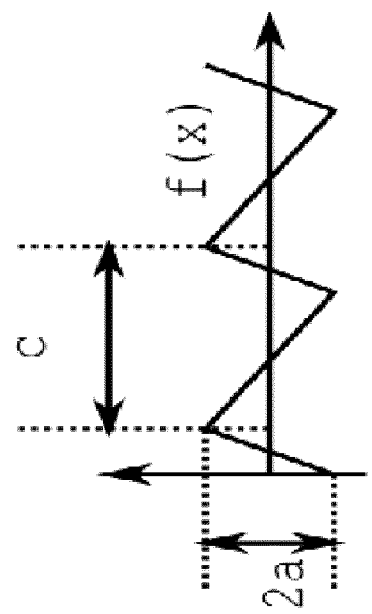
Fig. 5

DEVICE AND METHOD FOR PROCESSING AN INDUCTOR CURRENT

CROSS-REFERENCE TO PRIOR APPLICATIONS

This application is the U.S. National Phase application under 35 U.S.C. § 371 of International Application No. PCT/EP2016/068121, filed on Jul. 29, 2016, which claims the benefit of European Patent Application No. 15180349.1, filed on Aug. 10, 2015. These applications are hereby incorporated by reference herein.

FIELD OF THE INVENTION

The present invention relates to the field of techniques for current control in switched-mode power supplies. In particular, the present invention relates to a device for processing an inductor current, a power converter, a high power pre-regulator for X-ray generation, and a method for processing an inductor current.

BACKGROUND OF THE INVENTION

Switched-mode power converters perform the power conversion by periodically storing and releasing energy within reactive components. This process of periodically storing and releasing energy is controlled by power switches. The most common power converter topologies, like e.g. buck converters, boost converters, buck-boost converters, full-bridge converters store the energy within an inductor, i.e. they provide energy storage in the magnetic field originating from the current flowing through the winding of the inductor.

During the energy-storage phase, the inductor current increases approximately linearly, whereas it decreases also approximately linearly during the energy-release phase. In order to simplify the design and the control of these converters, the inductor is often dimensioned so that at the end of the energy-release phase, the inductor current is still higher than zero. Thus, as a consequence, the inductor is never completely discharged. This is known as continuous conduction mode, CCM.

If the power consumed by the load decreases, the average value of the inductor current reduces and thus the minimum value of the inductor current approaches to zero. In power converters synthesized with unidirectional power switches, for instance diodes, the inductor current cannot reverse. Consequently, if the inductor current reaches zero during the energy-release phase, because of the unidirectional switches, it will remain zero until the switches are activated again (energy-storage phase). This is known as discontinuous conduction mode, DCM.

DE GUSSEME K ET AL: "Sample correction for digitally controlled boost PFC converters operating in both CCM and DCM", APEC 2003. 18TH. ANNUAL IEEE APPLIED POWER ELECTRONICS CONFERENCE AND EXPOSITION. MIAMI BEACH, Fla., Feb. 9-13, 2003; [ANNUAL APPLIED POWER ELECTRONICS CONFERENCE], NEW YORK, N.Y.: IEEE, US, 9 Feb. 2003 (2003-02-09), pages 389-395 vol. 1 discloses a digitally controlled boost PFC converter operating in both CCM and DCM and a study of the input current distortion caused by the sampling algorithm. A correction factor is derived to compensate for the error on the input current samples. The theoretical results are verified experimentally.

SUMMARY OF THE INVENTION

There may be a need to improve devices and methods for processing an inductor current.

These needs are met by the subject-matter of the independent claims. Further exemplary embodiments are evident from the dependent claims and the following description.

An aspect of the present invention relates to a device for processing an inductor current, the device comprising: a sensor module, which is configured to measure an inductor current through an inductor of the power converter; a compensation module, which is configured to generate a compensation waveform; and an operating module, which is configured to provide a continuous conduction mode current signal based on a summation of the compensation waveform and the inductor current and which is configured to control the power converter based on the provided continuous conduction mode current signal.

The present invention advantageously provides a technique which simplifies any processing of the inductor current and the control of converters in continuous conduction mode and discontinuous conduction mode by using for all modes a continuous conduction mode current waveform, or in other words, by using a CCM-like waveform regardless of the mode the converter is operated in.

The present invention advantageously allows processing an inductor current and a thereon based controlling of a converter operating in discontinuous conduction mode in a very similar way as if it was operating in continuous conduction mode, which significantly simplifies any transition between continuous conduction mode and discontinuous conduction mode, and vice versa.

According to a further, second aspect of the present invention, a power converter is provided, the power converter comprising at least one inductor and a device according to the first aspect of the present invention or according to any implementation form of the first aspect of the present invention.

According to a further, third aspect of the present invention, a high power pre-regulator for X-ray generation is provided, the high power pre-regulator for X-ray generation comprising at least one power converter according to the second aspect of the present invention or according to any implementation form of the second aspect of the present invention.

According to a further, fourth aspect of the present invention, a method for processing an inductor current is provided, the method comprising the steps of:
a) Measuring an inductor current through an inductor of the power converter;
b) Generating a compensation waveform; and
c) Providing a continuous conduction mode current signal based on the compensation waveform and on the inductor current; and
d) Controlling the power converter based on the continuous conduction mode current signal.

According to an exemplary embodiment of the present invention, the device may comprise a plurality of compensation modules and the power converter may comprise a plurality of inductors. For example, the device may comprise as many compensation modules as the power converter has inductors. In other words, one compensation module is configured to generate a compensation waveform which is assigned to one inductor out of the plurality of inductors of the power converter. This advantageously allows an improved controlling of the power converter.

According to an exemplary embodiment of the present invention, the operating module is configured to control the power converter in continuous conduction mode and/or in discontinuous conduction mode based on the continuous conduction mode current signal, i.e. a CCM-like current signal. This advantageously allows an improved controlling of the power converter, since regardless of the operating mode of the power converter (either DCM or CCM), a controller designed for CCM can be used for controlling the power converter.

According to an exemplary embodiment of the present invention, the operating module is configured to control the power converter using a predefined switching frequency. This advantageously allows further improving the generation of the compensation waveforms.

In the present invention, the operating module is configured to minimize changes of the continuous conduction mode current signal during a transition from continuous conduction mode to discontinuous conduction mode and/or during a transition from discontinuous conduction mode to continuous conduction mode. This advantageously allows an improved processing of the inductor current for converter controlling.

According to an exemplary embodiment of the present invention, the operating module is configured to control the power converter based on the CCM-like current waveform comprising negative waveform values. This advantageously allows an improved processing of the inductor current.

According to an exemplary embodiment of the present invention, the operating module is configured to control the power converter based on the continuous conduction mode current signal comprising a triangle waveform, i.e. a triangle CCM-like waveform. This advantageously allows improving the generation of the compensation waveforms.

According to an exemplary embodiment of the present invention, the operating module is configured to use the continuous conduction mode current signal in a control loop for controlling the power converter. This advantageously allows improving the controlling of the power converter.

According to an exemplary embodiment of the present invention, the operating module is configured to provide the control loop using a proportional controller, or an integral controller, or a derivative controller, or a proportional-integral controller or a proportional-integral-derivative controller. This advantageously allows improving the controlling of the power converter.

A computer program performing the method of the present invention may be stored on a computer-readable medium. A computer-readable medium may be a floppy disk, a hard disk, a CD, a DVD, an USB (Universal Serial Bus) storage device, a RAM (Random Access Memory), a ROM (Read Only Memory) and an EPROM (Erasable Programmable Read Only Memory). A computer-readable medium may also be a data communication network, for example the Internet, which allows downloading a program code.

The methods, systems and devices described herein may be implemented as software in a Digital Signal Processor, DSP, in a micro-controller or in any other side-processor such as a hardware circuit within an application specific integrated circuit, ASIC.

The present invention can be implemented in digital electronic circuitry, or in computer hardware, firmware, software, or in combinations thereof, e.g. in available hardware of a device or in new hardware dedicated for processing the methods described herein.

A more complete appreciation of the present invention and the attendant advantages thereof will be more clearly understood by reference to the following schematic drawings, which are not to scale.

BRIEF DESCRIPTION OF THE DRAWINGS

Exemplary embodiments of the invention will be described in the following with reference to the following drawings:

FIG. 3 shows a schematic diagram of generic triangle waveforms illustrating different behaviours in discontinuous conduction mode and in continuous conduction mode according to an exemplary embodiment of the present invention;

FIG. 5 shows a schematic diagram of the generic triangle waveform illustrating different behaviours in discontinuous conduction mode and continuous conduction mode and also in discontinuous conduction mode with the waveform correction according to an exemplary embodiment of the present invention;

DETAILED DESCRIPTION OF EMBODIMENTS

Figure 1:
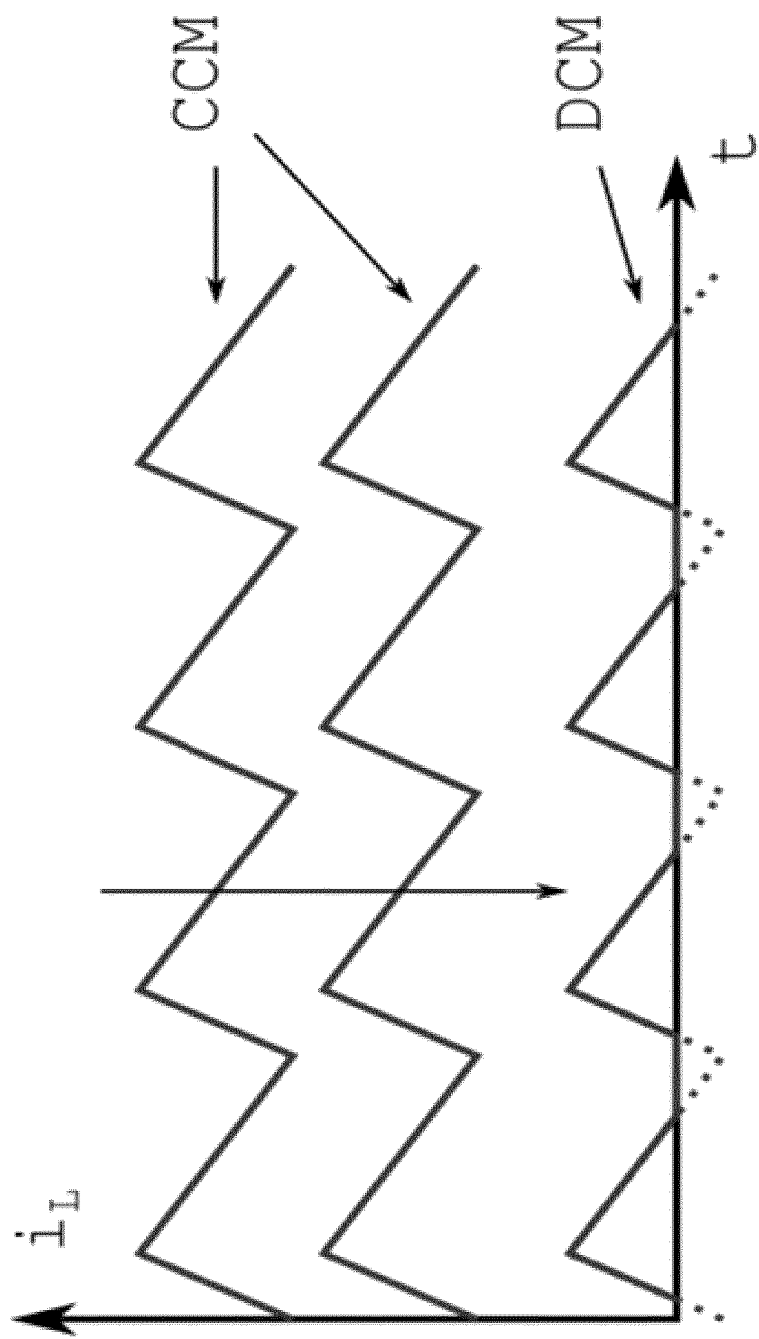
FIG. 1 shows a schematic diagram of the inductor current in continuous conduction mode and in discontinuous conduction mode according to an exemplary embodiment of the present invention.

The illustration in the drawings is purely schematic and does not intend to provide scaling relations or size information. In different drawings or figures, similar or identical elements are provided with the same reference numerals. Generally, identical parts, units, entities or steps are provided with the same reference symbols in the description.

FIG. 1 shows a schematic diagram of the inductor current in continuous conduction mode and in discontinuous conduction mode according to an exemplary embodiment of the present invention. In FIG. 1, the arrow indicates the change the inductor current plots due to lighter load conditions for the converter.

According to an exemplary embodiment of the present invention, switched-mode power converters perform the power conversion by periodically storing and releasing energy within reactive components; this process is controlled by power switches. Different power converter topologies, for instance buck converters, boost converters, buck-boost converters, or full-bridge converters, store the energy within an inductor.

According to an exemplary embodiment of the present invention, during the energy-storage phase, the inductor current increases—approximately—linearly, whereas it decreases—also approximately—linearly during the energy-release phase. In order to simplify the design and the control of these converters, the inductor is often dimensioned so that at the end of the energy-release phase, the inductor current is still higher than zero; the inductor is hence never completely discharged, i.e. Continuous Conduction Mode, CCM, as shown in FIG. 1.

In CCM, the peak-to-peak ripple in the inductor current is determined by the input and output voltages and the inductance value (load independent), whilst the average current is determined by the output voltage and the load (independent of the inductance value). It is noted that this determination of the peak-to-peak ripple in the inductor current $i_L$ is just an example; in other topologies the dependencies could be different.

Switched-mode power converters are generally required to properly operate within a certain power range, instead of just in one operating point. This range often includes very light loads or even no load at all. Since the load determines the average current, reducing the load current lowers the average inductor current. When the load becomes light enough so that the average current is lower than half the peak-to-peak current ripple, the inductor current locally reverses i.e. becomes negative.

According to an exemplary embodiment of the present invention, in power converters synthesised with unidirectional power switches (such as diodes), the inductor current cannot reverse. Instead, once the current becomes zero, it remains zero until the switches are activated again, i.e. discontinuous conduction mode, DCM, as shown in FIG. 1. This different behaviour results in different dynamics than those in CCM. In DCM, the current cannot be negative because of the unidirectional switches, and hence it remains zero. Converters are mostly designed to operate in CCM because in this mode the dynamics of the power converters are load independent. In DCM, however, the dynamics do depend upon the load which makes control design more difficult. The specifications often require operating with heavy, medium, light and even no load thus transitioning between CCM and DCM must be handled with care in order to guarantee the stability and proper operation of the converter in DCM. In FIG. 1, the inductor current $i_L$ is plotted as functions for the two different modes over time t.

Figure 2:
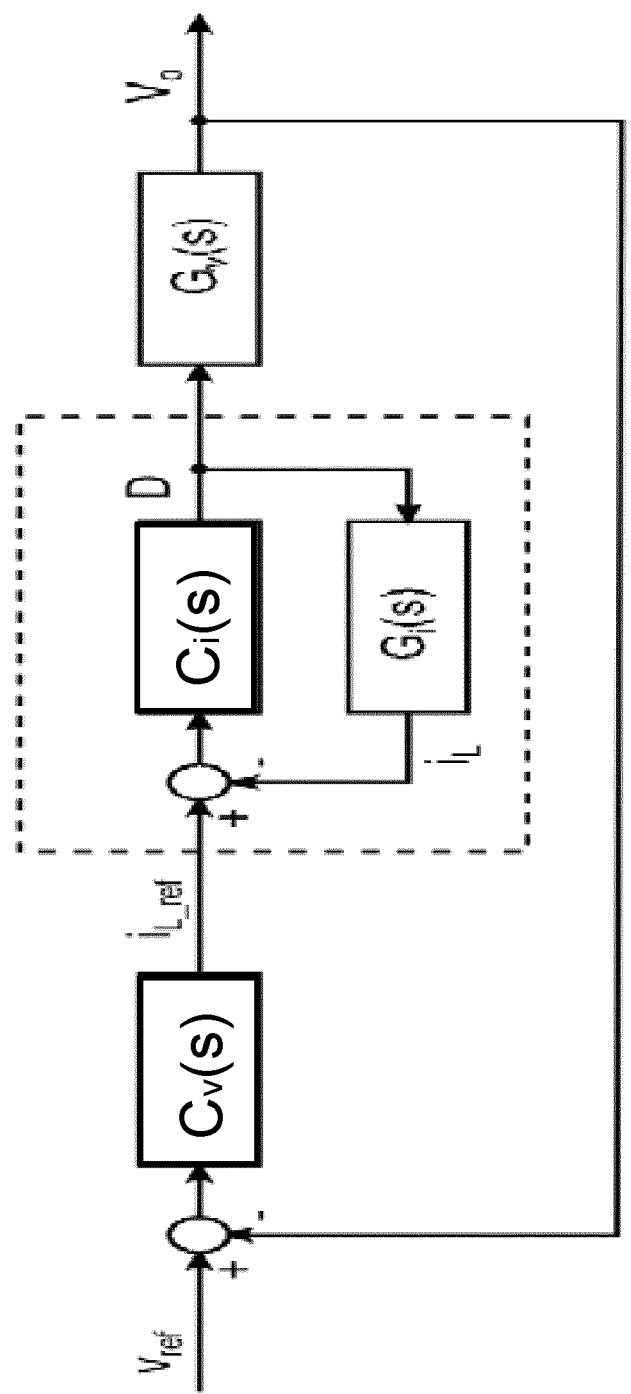
FIG. 2 shows a schematic diagram of a block diagram of a switched-mode power converter with a double control loop according to an exemplary embodiment of the present invention.

FIG. 2 shows a schematic diagram of a block diagram of a switched-mode power converter with a double control loop according to an exemplary embodiment of the present invention.

There exist several different techniques for designing control loops for power converters. Classical control techniques, e.g. pulse-width modulation (PWM), or pulse-duration modulation (PDM), often include a current control loop for enhanced converter stability and bandwidth, as shown in FIG. 2.

According to an exemplary embodiment of the present invention, the outer (slow) control loop, i.e. the voltage control, generates a reference for the inner (fast) control loop, i.e. the current control, which in turn generates the duty cycle D that is finally supplied to the modulator. The inner control loop is visualized by the dashed line. The modulator generates a two-level switching signal based on the duty cycle D; this two-level switching signal directly controls the power switches.

The terms "slow control loop" and "fast control loop" may refer to the time constants of the respective control loop. For instance, the time constant of the slow control loop is double the time constant of the fast control loop.

FIG. 2 shows a block diagram of a switched-mode power converter with double control loop. Cv(s) and Ci(s) stand for the compensators (voltage and current respectively) and Gv(s) and Gi(s) stand for the converter's transfer functions (control-to-output voltage and control-to-inductor current respectively).

Further in FIG. 2, $i_L$ denotes the inductor current, $V_{ref}$ a reference voltage, $V_O$ an output voltage, and $I_{L\_ref}$ denotes a reference inductor current.

FIG. 3 shows a schematic diagram of generic triangle waveforms illustrating different behaviours in discontinuous conduction mode and in continuous conduction mode according to an exemplary embodiment of the present invention.

Current control loops designed for CCM operation tend to significantly degrade their performance or even to become unstable when the converter enters DCM. Let us analyse in more detail the effect of DCM upon the current waveforms.

According to an exemplary embodiment of the present invention, the function f(x) may be a triangle waveform with average zero and peak-to-peak amplitude of 2a. This function is c periodic f(x+c*k)=f(x), for all k integer, as shown in FIG. 3. The function g(x) may be defined as g(x)=b+f(x), where b is a real value. The average value of g(x) can be defined as $$d = \frac{1}{c} \int_{<c>} (b + f(u)) du$$

If b>a, g(x) is always positive and hence b=d, as shown in FIG. 3. This waveform corresponds to an inductor operating in CCM. When b<a, g(x) becomes locally negative. If g(x) is restricted not to be negative (as in converters operating in DCM), g(x) locally saturates to zero. Hence, b and d differ. When b is equal to −a, then d reaches zero, i.e. no signal at all is generated.

According to an exemplary embodiment of the present invention, a technique which simplifies the control of converters in DCM by generating CCM-like waveforms is provided. This allows controlling a converter operating in DCM in a very similar way as if it was operating in CCM, which significantly simplifies the transition between CCM and DCM from the control standpoint.

Figure 4:
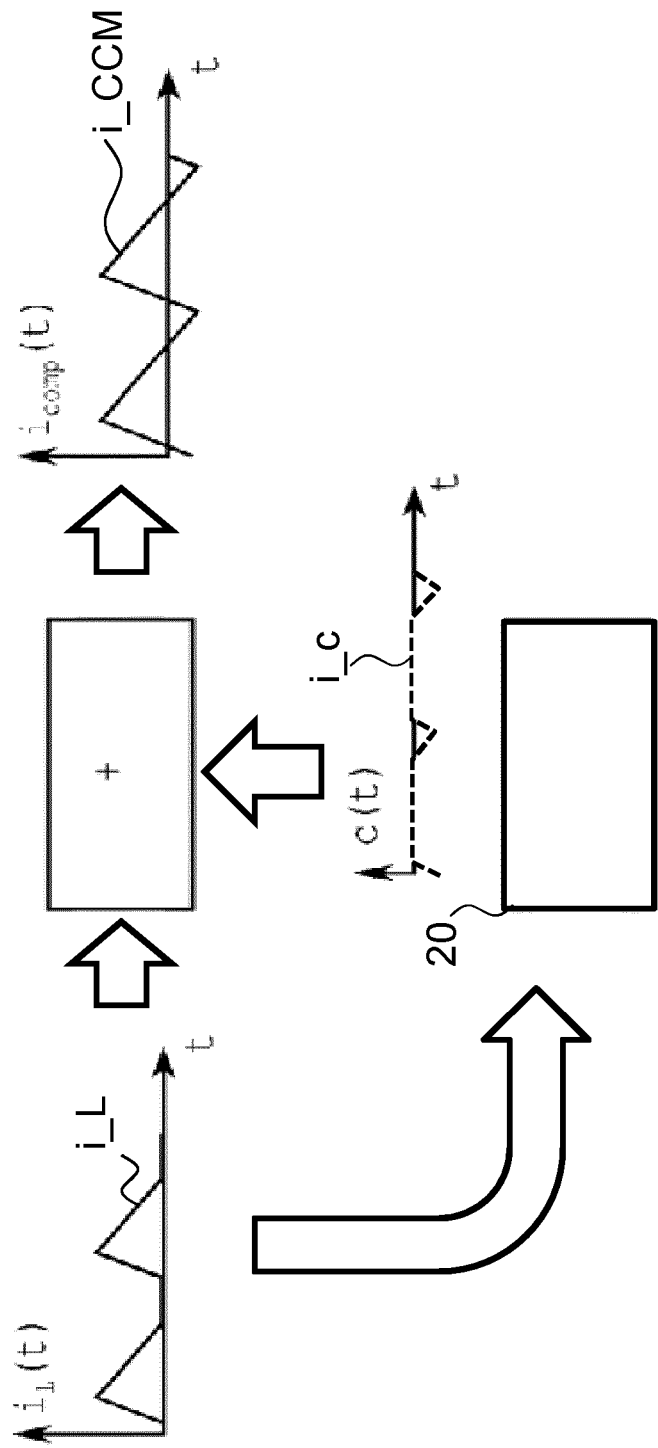
FIG. 4 shows a schematic diagram of the creation of the CCM-like waveform from the original current waveform and the compensation waveform according to an exemplary embodiment of the present invention.

FIG. 4 shows a schematic diagram of the creation of the CCM-like waveform from the original current and a compensated waveform according to an exemplary embodiment of the present invention. All waveforms as shown in FIG. 4 are plotted over time t.

FIG. 4 shows the creation of the compensated current icomp(t), from the original current i_L and the compensation waveform i_c.

The compensation module 20 may be configured to measure the inductor current i_L and to generate the compensation waveform i_c. These two waveforms are then combined together to generate the CCM-like waveform icomp(t) as shown in FIG. 4. The CCM-like waveform can then be used as the inductor current in the control loop, as in regular operation.

This extension changes the values of the measured current. Certainly, if applying this correction to the exemplary waveforms depicted in FIG. 3, the signal d (average value) becomes negative when b<a (i.e. DCM). This is illustrated in FIG. 5 (dashed line).

FIG. 5 shows a schematic diagram of the generic triangle waveform illustrating different behaviours in discontinuous conduction mode and in continuous conduction mode according to an exemplary embodiment of the present invention.

Despite the average value changes, the ratio between d and b is still linear. This simplifies indeed the CCM-DCM transition from the control standpoint. The outer control loop, i.e. the voltage compensator as shown in FIG. 2, provides the reference for the current control loop. Because of the change in the current value, the outer control loop needs to provide now a different value. On the other hand, because of the linear ratio, the same set of control compensators can easily do that.

Figure 6:
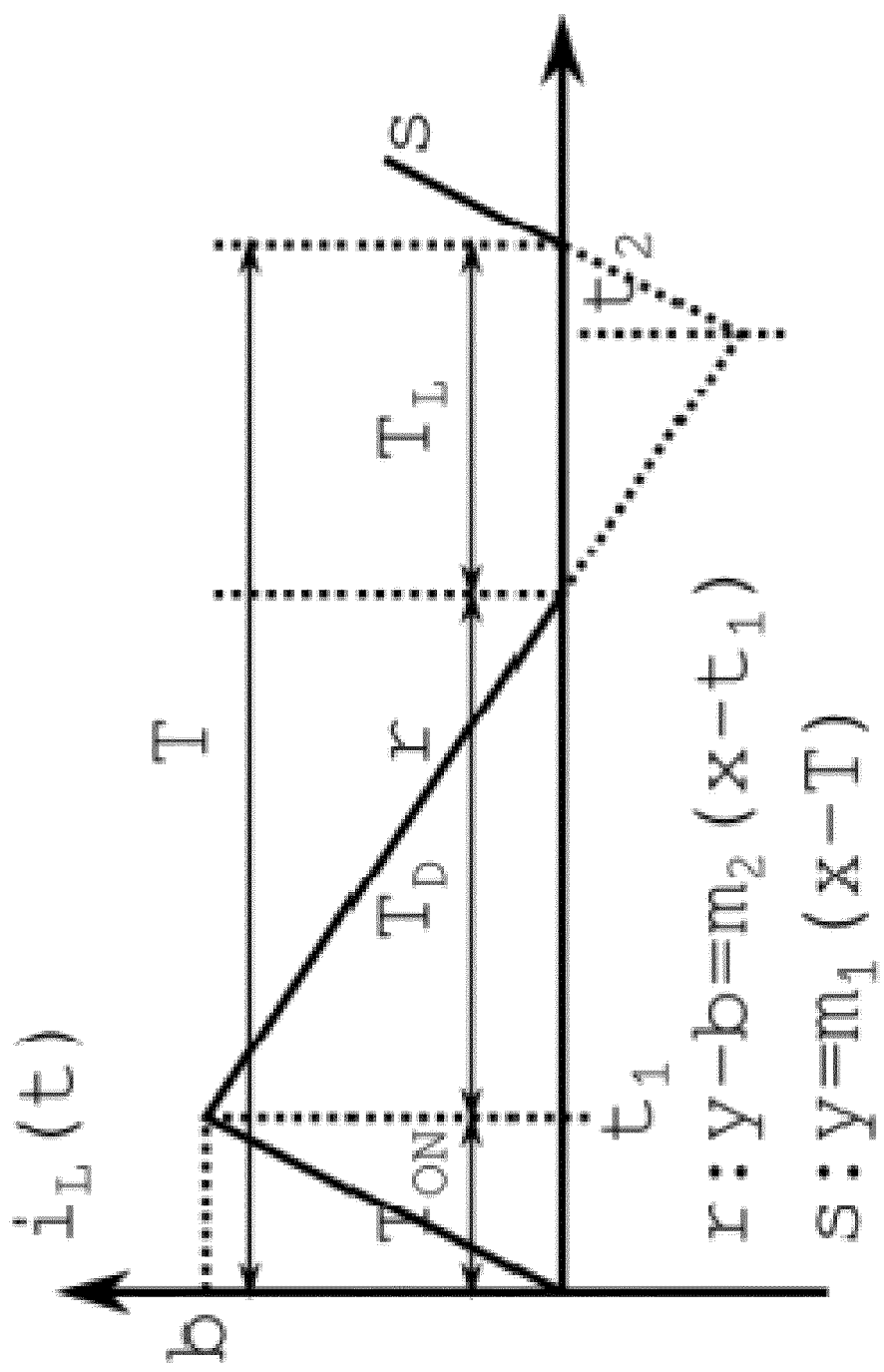
FIG. 6 shows a schematic diagram of a calculation of the compensation waveform according to an exemplary embodiment of the present invention.

FIG. 6 shows a schematic diagram of a calculation of the compensation waveform according to an exemplary embodiment of the present invention.

As an example, FIG. 6 shows how to generate the compensated current if a triangle waveform is assumed. If the inductor current can be approximated by simple waveforms or functions for instance in form of a triangle waveform, it can also be easily predicted. Even if the current could not be approximated by straight lines it could still be predicted, but it would require more computational power.

Let T be the switching period and let the converter operate in DCM. The period starts when the switch is activated (i.e. the inductor current starts to increase); the switch is kept ON during $T_{ON}$. Then the switch is turned OFF; at this moment, the inductor current can be captured (for instance with a sample and hold circuit). Let this value be b. $T_{ON}$ can be measured by simply integrating the switch control signal; let this time be $t_1$.

Provided that the slope of $i_L(t)$ is only determined by the supply and output voltages (which are approximately constant within a switching cycle) and the inductance L, the rising slopes m1 and falling slopes m2 can be measured. This is all the information required to determine the compensation signal c(t). Further provided that vLon stands for the inductor voltage during Ton and vLon>0, and vLoff stands for the inductor voltage during Toff and vLoff<0.

Indeed, the time instant t2 is given by the intersection of the straight lines r and s. This is:

$$t_2 = \frac{v_{Loff}t_1 - bL - v_{Lon}T}{v_{Loff} - v_{Lon}}$$

Figure 7:
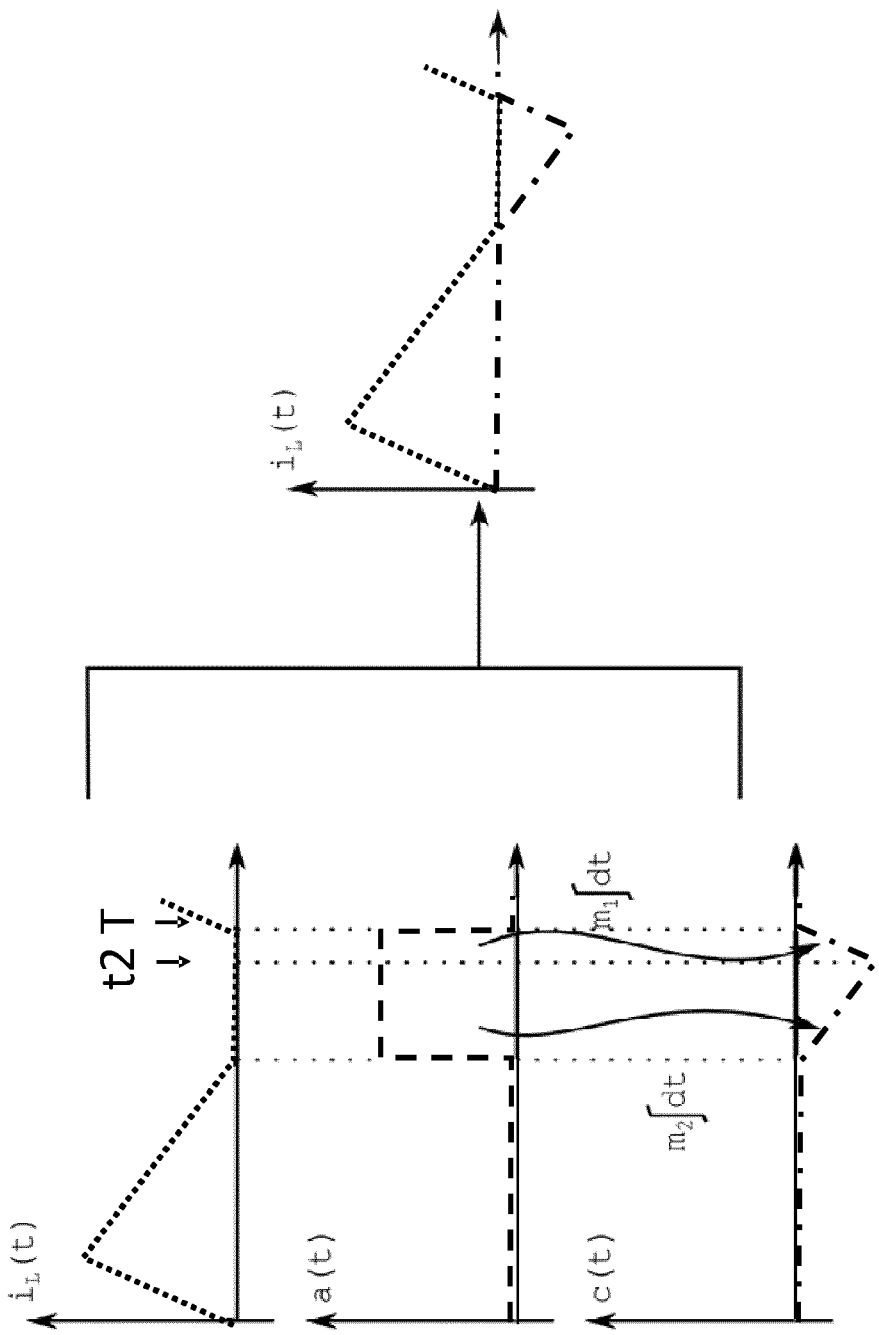
FIG. 7 shows a schematic diagram of a construction of the compensation signal from the inductor current, the measured slopes, and the estimation of the time point according to an exemplary embodiment of the present invention.

FIG. 7 shows a schematic diagram of a construction of the compensation signal from the inductor current, the measured slopes, and the estimation of the time point according to an exemplary embodiment of the present invention. The inductor current iL(t) can then be compared to an arbitrary value, e.g. a threshold value or for instance to zero (see signal a(t) as shown in FIG. 7); when the current is zero a pulse is generated. This pulse can be integrated and scaled, so that the resulting waveform, i.e. the compensation signal c(t), is the extension of iL(t) to negative values; this integration continues until t2 is reached. At that time, the gain is changed, so that the compensation signal increases. If all parameters are properly measured and/or calculated, the compensation signal reaches zero exactly at T, thereby emulating a CCM inductor current.

Figure 8:
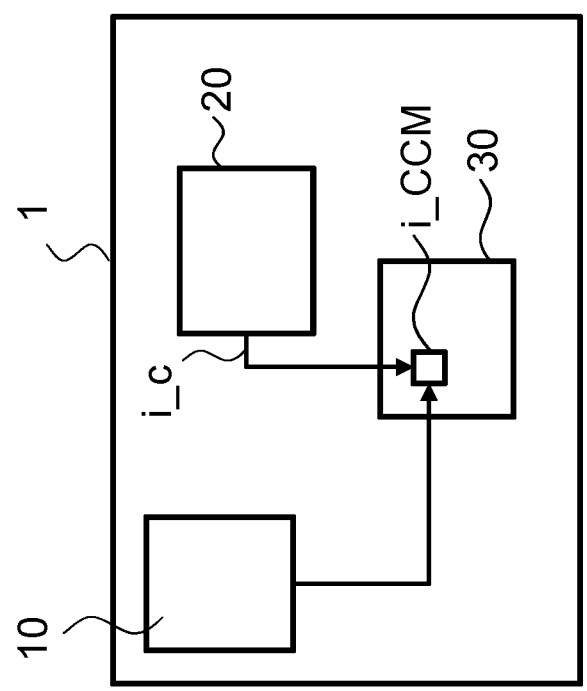
FIG. 8 shows a schematic diagram of a device for processing an inductor current according to an exemplary embodiment of the present invention.

FIG. 8 shows a schematic diagram of a device for processing an inductor current and for controlling a power converter according to an exemplary embodiment of the present invention.

A device 1 for processing an inductor current and for controlling a power converter 100 may comprise a sensor module 10, a compensation module 20, and an operating module 30.

The sensor module 10 is configured to measure an inductor current i_L through an inductor of the power converter 100.

The compensation module 20 is configured to generate a compensation waveform i_c.

The operating module 30 is configured to provide a continuous conduction mode current signal i_CCM based on a summation of the compensation waveform i_c and of the inductor current i_L and which is configured to control the power converter 100 based on the provided continuous conduction mode current signal i_CCM.

Figure 9:
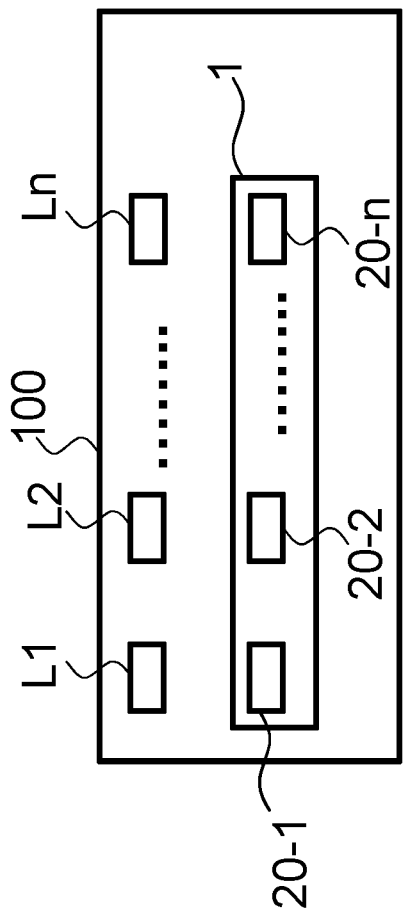
FIG. 9 shows a schematic diagram of a power converter according to an exemplary embodiment of the present invention.

FIG. 9 shows a schematic diagram of a high power pre-regulator for X-ray generation according to an exemplary embodiment of the present invention.

The high power pre-regulator for X-ray generation may comprise at least one power converter 100.

The power converter may comprise at least one inductor L1, L2, . . . , Ln and a device 1.

According to an exemplary embodiment of the present invention, the device 1 may comprise a plurality of compensation modules 20-1, 20-2, . . . , 20-n, wherein one compensation module 20-1, 20-2, . . . , 20-n is assigned to one inductor L1, L2, . . . , Ln of the power converter 100.

Figure 10:
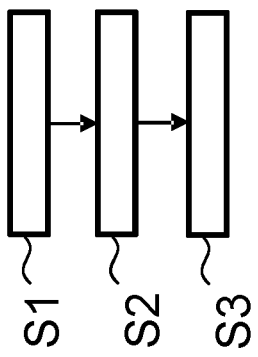
FIG. 10 shows a schematic diagram of a flow-chart diagram of a method for processing an inductor current and for controlling a power converter according to an exemplary embodiment of the present invention.

FIG. 10 shows a schematic diagram of a flow-chart diagram of a method for processing an inductor current according to an exemplary embodiment of the present invention.

The method may comprise the following steps:

As a first step of the method, measuring S1 an inductor current i_L through an inductor L1, L2, . . . , Ln of the power converter 100 may be performed.

As a second step of the method, generating S2 a compensation waveform i_c may be conducted.

As a third step of the method, providing S3 a continuous conduction mode current signal i_CCM based on the compensation waveform i_c and on the inductor current i_L and controlling the power converter 100 based on the continuous conduction mode current signal i_CCM may be performed.

The method may also be used for controlling a power converter 100 using the processed inductor current.

It has to be noted that embodiments of the present invention are described with reference to different subject-matters. In particular, some embodiments are described with reference to method type claims whereas other embodiments are described with reference to device type claims.

However, a person skilled in the art will gather from the above and the foregoing description that, unless otherwise notified, in addition to any combination of features belonging to one type of the subject-matter also any combination between features relating to different subject-matters is considered to be disclosed with this application.

However, all features can be combined comprising synergetic effects that are more than the simple summation of these features.

While the present invention has been illustrated and described in detail in the drawings and the foregoing description, such illustration and description are to be considered illustrative or exemplary and not restrictive; the present invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A power convert, comprising:
   at least one inductor;
   a sensor module configured to measure an inductor current through the at least one inductor;
   a compensation module configured to generate a compensation waveform; and
   an operating module configured to provide a continuous conduction mode current signal that comprises positive and negative signal values, wherein the continuous conduction mode current signal is based on a summation of the compensation waveform and the inductor current to control the power converter.

2. The power converter according to claim 1, wherein the operating module is configured to control the power converter in a continuous conduction mode and/or in a discontinuous conduction mode based on the continuous conduction mode current signal.

3. The power converter according to claim 1, wherein the operating module is configured to control the power converter using a predefined switching frequency.

4. The power converter according to claim 1, wherein the operating module is configured to control the power converter based on the continuous conduction mode current signal that comprises a triangle waveform.

5. The power converter according to claim 1, wherein the operating module is configured to use the continuous conduction mode current signal in a control loop for controlling the power converter.

6. The power converter according to claim 5, wherein the operating module is configured to provide the control loop using at least one of a proportional controller, an integral controller, a derivative controller, a proportional controller, and a proportional-integral-derivative controller.

7. A method for processing an inductor current in a power converter, the method comprising:
   measuring an inductor current through an inductor of the power converter;
   generating a compensation waveform;
   providing a continuous conduction mode current signal that comprises positive and negative signal values, wherein the continuous conduction mode current signal is based on a summation of the compensation waveform and the inductor current; and
   controlling the power converter based on the continuous conduction mode current signal.

8. The method according to claim 7, wherein the power converter is controlled in a continuous conduction mode and/or in a discontinuous conduction mode based on the continuous conduction mode current signal.

9. A non-transitory computer-readable medium having one or more executable instructions stored thereon which, when executed by at least one processor, cause the at least one processor to perform a method for processing an inductor current in a power converter, the method comprising:
   measuring an inductor current through an inductor of the power converter;
   generating a compensation waveform;
   providing a continuous conduction mode current signal that comprises positive and negative signal values, wherein the continuous conduction mode current signal is based on a summation of the compensation waveform and the inductor current; and
   controlling the power converter based on the continuous conduction mode current signal.

* * * * *